Nov. 7, 1939. R. TAYLOR Re. 21,258

HOSE

Original Filed June 26, 1934 3 Sheets-Sheet 1

INVENTOR
Raymond Taylor
By Baska & Collings
ATTORNEYS

Nov. 7, 1939. R. TAYLOR Re. 21,258

HOSE

Original Filed June 26, 1934 3 Sheets-Sheet 2

INVENTOR
Raymond Taylor
By Parker & Collings
ATTORNEYS

HOSE

Original Filed June 26, 1934 3 Sheets-Sheet 3

Inventor
Raymond Taylor,
Barker & Collings
Attorney.

Reissued Nov. 7, 1939 Re. 21,258

UNITED STATES PATENT OFFICE 21,258

HOSE

Raymond Taylor, Earl Shilton, England, assignor, by mesne assignments, to Hosiery Patents, Inc., Wilmington, Del., a corporation of Delaware Original No. 2,117,921, dated May 17, 1938, Serial No. 732,541, June 26, 1934. Application for reissue July 10, 1939, Serial No. 284,022. In Great Britain April 10, 1934

7 Claims. (Cl. 66—172)

This invention is for improvements in or relating to hose or the like. It is chiefly concerned with ladies' hose, which, as is well known, extend above the knee and are commonly supported by means of suspenders. Because such a stocking is pulled up taut over the knee, as the latter is flexed the stocking is subjected to considerable tension both in the circumferential and in the longitudinal direction. The latter stress is more or less concentrated or localized because the suspender only affords a local grip, and hence is a prolific cause of ladders. Moreover, because knitted fabric is possessed of substantial elasticity only in the direction of the courses (i. e. circumferentially of a hose) the courses are distorted by the pull of the suspender, giving an untidy appearance.

These disadvantages are obviated according to the present invention by providing a hose or the like having an upper part (e. g. that part which in a stocking comes at or above the knee) of fabric which is capable of substantial stretch both in the circumferential and in the longitudinal direction. This two-way stretch is most conveniently achieved by working elastic thread into the fabric. It is of course well known to lay elastic thread weft-wise between the oppositely drawn loops of a rib-knitted upper portion of golf hose, men's socks, and the like without knitting the thread into loops, but owing to the unidirectional disposition of the elastic thread at all times, this does not impart two-way stretch to the article—only increased elasticity in the circumferential direction.

According to an important feature of the present invention the elastic thread is so worked into the fabric comprised in the upper part of the article that it extends to some extent longitudinally thereof, at least when the article is stretched in that direction. Therefore there is incorporated in the top of the hose or the like, preferably at or above the knee, lace made wholly or in part of elastic thread.

Figure 1:
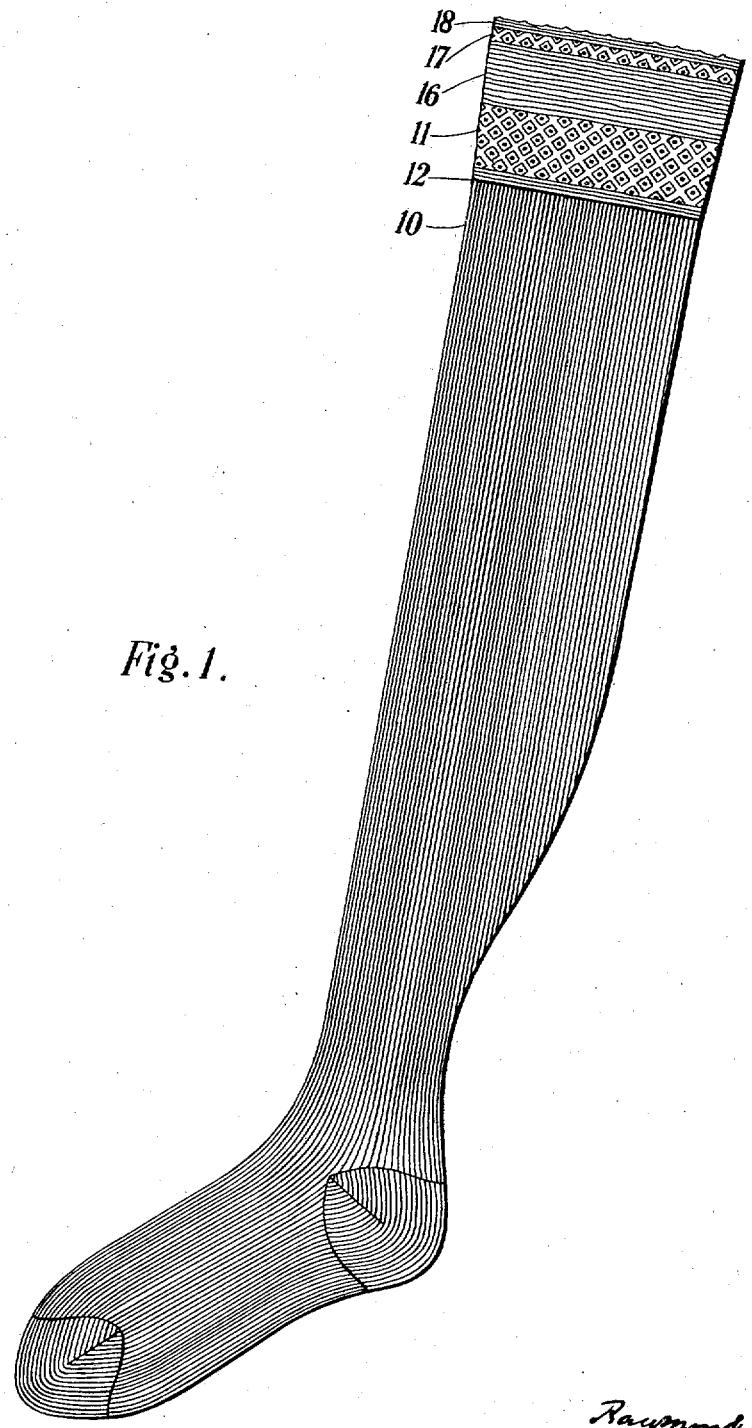
Figure 2:
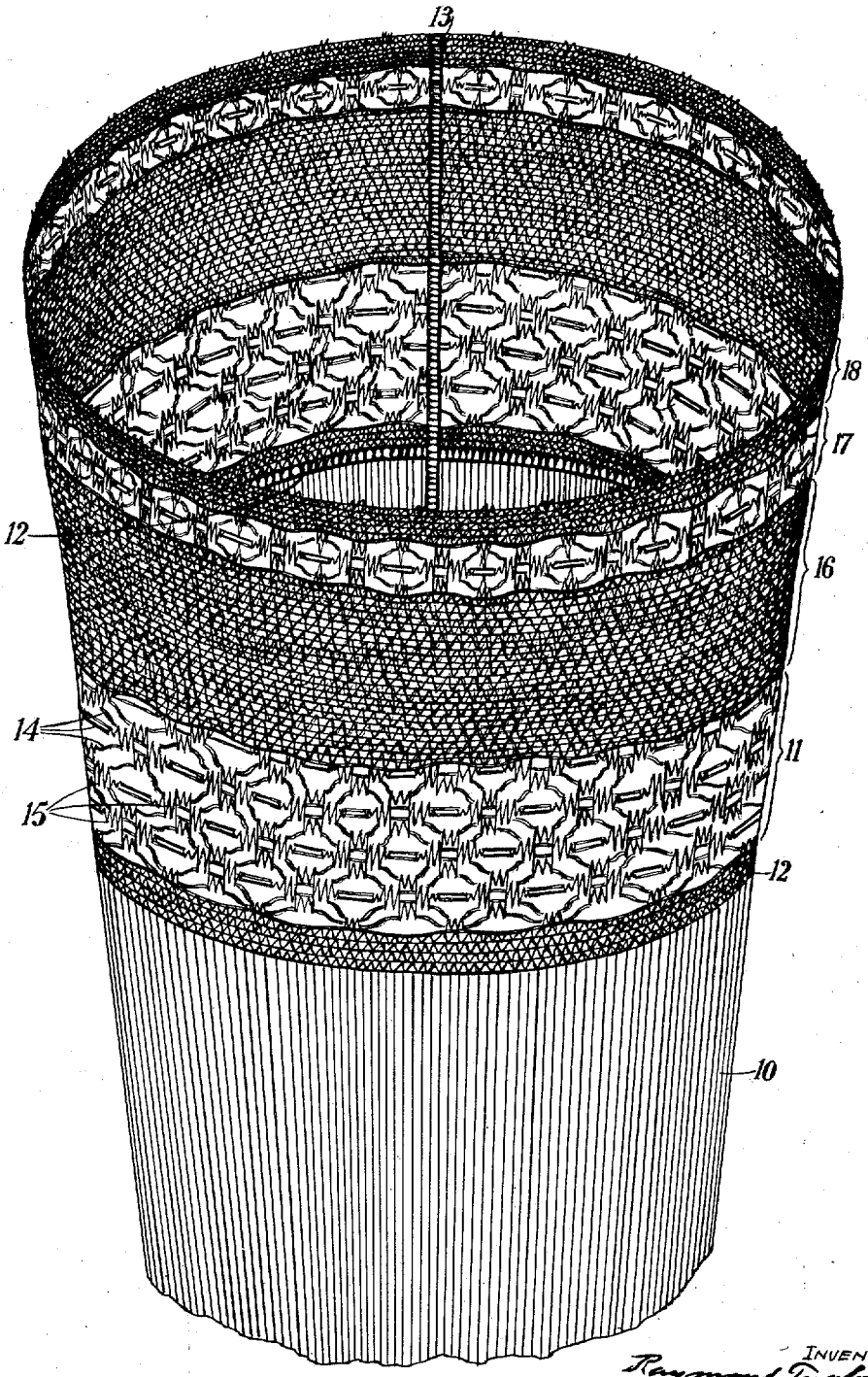

A preferred embodiment of this invention is illustrated in the accompanying drawings, in which Figure 1 is a view of a ladies' hose having a two-way stretch portion at the top, and Figure 2 is a view, on an enlarged scale, of said two-way stretch portion.

Figure 3:
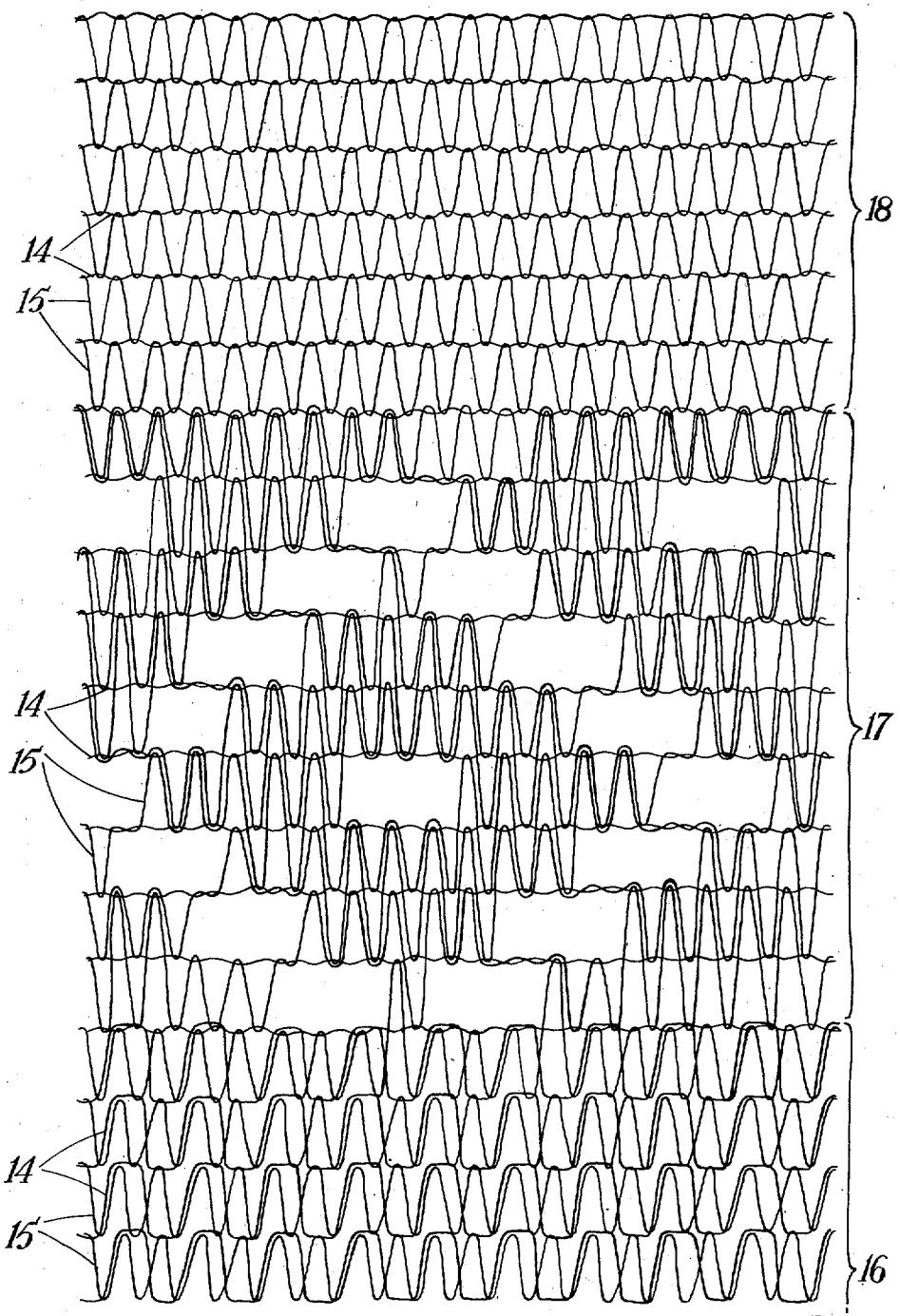

Figure 3 is a view of a section of the fabric employed for the suspender grip portion of a stocking embodying the present invention.

Throughout this description like reference numerals indicate like parts.

The hose shown (which may either be fully fashioned or seamless) is provided, above the plain knitted leg 10 and in the position usually occupied by the welt, with a two-way stretch portion 11 of lace fabric.

In the preferred embodiment of this invention this lace portion 11 takes the form of a circumferential band produced, separately from the hose, upon a lace machine of known or approved type, such as a levers or go-through machine, and either seamed to the top of the hose (as is preferred) at 12 or run on to the needles by which the hose is knitted. The said band 11 is conveniently produced in strip form, the requisite length being cut from the strip and the ends of it seamed together at 13 before or after it has been seamed to the hose.

In the strip from which the band 11 is formed there are longitudinal elastic threads 14 with which finer textile threads 15 pillar in any desired lace or open work pattern. Therefore these elastic threads are bound together at intervals, in groups, as are the bobbin threads in ordinary lace, and are distorted from the straight into a sinuous or zig-zag course. This sinuosity is even more pronounced when the band is stretched sideways (i. e. when the hose is stretched longitudinally) and the longitudinal elasticity of the upper part of the hose is a result of it.

The greater the sinuosity of the elastic threads the greater the longitudinal elasticity of the hose, and it may be desirable for this purpose to choose a weave in which the elastic threads are bound together at intervals in groups of three or more. Lace weaves or patterns suitable for the purpose of this invention will present no difficulty to the lace manufacturer.

It is an advantage if, above the two-way stretch band 11 of the hose, there is a band 16 of fabric which is stouter than the ordinary fabric of the hose and so affords a good grip for the suspenders and is not liable to rupture. This welt or suspender grip-band 16 is preferably produced on the lace machine as a band of clothing at the side of the lace band 11 and united thereto. Elastic threads are desirably incorporated in this clothing also, so that a garter portion is formed at the top of the hose. Above the clothing 16 there may be a further narrow band 17 of elastic lace, and at the extreme top of the hose a very narrow band of clothing 18 incorporating the elastic threads. In these bands of clothing, because they are made simultaneously with the bands 11, 17, the elastic threads extend in the main circumferentially, so that said bands are capable of circumferential stretch, but as the said threads are also bound together by textile threads which extend to and fro between them, when the stocking is strained longitudinally the elastic threads take up a sinuous form, and hence the bands of clothing are capable of stretch longitudinally of the hose also. The capacity of the band to readily stretch in two directions results more especially from the fact that contiguous elastic threads 14 in the intermediate zone 11 are connected together at circumferentially spaced points by the inelastic threads 15, and that the points of connection are staggered as between adjacent pairs of said elastic threads, with the result that considerable diagonally-extending float portions of the latter threads are left free as clearly shown in Fig. 2.

It is preferred that the elastic thread employed in the manufacture of hose and the like according to this invention shall be wrapped or covered.

Although reference has been made herein to a preferred embodiment of this invention having a specific open work or lace pattern for the circumferential band composed of elastic threads, and to certain machines upon which such a fabric may be made, it will be understood that this invention in its broader aspects is not confined to any particular pattern or limited in any way to the character or type of machine upon which the fabric is made, providing the elastic threads thereof are so incorporated and sinuously arranged as to allow stretch both circumferentially and longitudinally of the stocking.

I claim:—

1. A hose, having near the top a circumferential band of fabric incorporating elastic threads which extend side by side circumferentially of the hose, and other threads binding said elastic threads together at intervals, in groups, certain of which elastic threads extend to and fro between a plurality of groups.

2. In the extreme top of a ladies' stocking that has the leg knitted of relatively inelastic strands, an upper part of fabric made upon a lace machine and including a piece of clothing, which fabric incorporates elastic threads and is capable of stretch both longitudinally and circumferentially of the hose.

3. A ladies' full-length hose having a leg knitted of comparatively inelastic thread and having attached thereto a suspender grip, extending from the open end of the stocking to a position adjacent the knee of the wearer, which suspender grip consists of lace fabric, in which elastic threads are incorporated and which is capable of simultaneous stretch in directions both circumferentially and longitudinally of the stocking.

4. A ladies' full-length hose having a leg portion knitted of comparatively inelastic thread and having a top portion including a suspender grip at the open end of the stocking and an open mesh, non-ravel, lace fabric disposed beneath said suspender grip and above and adjacent to the knee and attached to said knitted leg portion, the top portion of said hose being designed to prevent the formation of runs above the knee, and the lace fabric of said top portion having incorporated therein sinuously arranged elastic threads whereby said fabric is capable of simultaneous stretch in directions both circumferentially and longitudinally of the hose to relieve strains upon the knitted leg portion caused by flexure of the knee.

5. A stocking having near its top, a circumferential band of lace fabric incorporating elastic threads which extend circumferentially of the stocking, and other threads which bind together adjacent elastic threads at circumferentially spaced points in staggered relation, with the result that substantial free portions of the elastic threads are left between the points of binding, whereby said band is given the capacity to yield both longitudinally and circumferentially of the stocking.

6. A stocking having at its top a circumferential band of lace fabric incorporating elastic threads which extend circumferentially of the stocking, said band being characterized by an upper portion in which the elastic threads are bound together throughout their length and by other threads, and a lower portion in which the elastic threads are bound together by other threads at spaced circumferential points in staggered relation, with the result that in said lower portion substantial free portions of the elastic threads are left between the points of binding whereby the band is given the capacity to stretch both longitudinally and circumferentially of the stocking.

7. A stocking having at its top a circumferential band of lace fabric incorporating elastic threads which extend circumferentially of the stocking, said band being characterized by upper and lower marginal portions in which the elastic threads are bound together throughout their lengths by other threads, and by an intermediate zone in which adjacent elastic threads are bound together by other threads at spaced circumferential points in staggered relation, with the result that in said zone, substantial free portions of the elastic threads are left between the points of binding, whereby the band is given the capacity to yield both longitudinally and circumferentially of the stocking.

RAYMOND TAYLOR.